United States Patent [19]
Coscarella et al.

[11] Patent Number: 5,459,838
[45] Date of Patent: Oct. 17, 1995

[54] I/O ACCESS METHOD FOR USING FLAGS TO SELECTIVELY CONTROL DATA OPERATION BETWEEN CONTROL UNIT AND I/O CHANNEL TO ALLOW THEM PROCEED INDEPENDENTLY AND CONCURRENTLY

[75] Inventors: Anthony S. Coscarella, Woodstock; Joseph L. Temple, Hurley, both of N.Y.

[73] Assignee: International Business Machines Corporation, Armonk, N.Y.

[21] Appl. No.: 257,421

[22] Filed: Jun. 9, 1994

Related U.S. Application Data

[63] Continuation of Ser. No. 950,844, Sep. 24, 1992, abandoned.

[51] Int. Cl.$^6$ .............................. G06F 13/12; G06F 13/14
[52] U.S. Cl. .................. 395/827; 395/850; 395/821; 395/439; 364/238.3; 364/260
[58] Field of Search ..................................... 395/275, 250, 395/400, 425

[56] References Cited

U.S. PATENT DOCUMENTS

| | | | |
|---|---|---|---|
| 3,771,136 | 11/1973 | Heneghan et al. | 340/172.5 |
| 4,040,037 | 8/1977 | Lawlor | 364/200 |
| 4,445,176 | 4/1984 | Burke et al. | 364/200 |
| 4,797,812 | 1/1989 | Kihara | 364/200 |
| 5,109,489 | 4/1992 | Umeno et al. | 395/275 |
| 5,204,950 | 4/1993 | Kawashima | 395/200 |
| 5,369,747 | 11/1994 | Muranoi | 395/250 |
| 5,392,409 | 2/1995 | Umeno et al. | 395/400 |
| 5,394,532 | 2/1995 | Belsan | 395/425 |

*Primary Examiner*—Thomas C. Lee
*Assistant Examiner*—Le Hien Luu
*Attorney, Agent, or Firm*—Whitham, Curtis, Whitham & McGinn; Lynn L. Augspurger

[57] ABSTRACT

An access method allows the separation of the command stream being sent to the control unit from the command stream interpreted by the channel. This access method allows the I/O subsystem to, first, reduce the number of interlocks required on the I/O interface. Second, the access method transfers as much of the I/O operation to the device as possible in a single block of data. Third, the access method allows the channel and device to "disconnect" from each other at the end of the transfer of this control information. The access method prepares the information to be transferred to the device in a single command. This is accomplished by means of a new flag in the CCW, using the spare bit in the flag field, called the DS flag. This flag allows the channel to operate as if it were a Chain Command (CC) from the view point of direction of data flow in the channel and a Chain Data (CD) from the view point of transferring control information across the interface. The channel I/O request can, under a single command to a device, control the direction (read or write) of the flow of data separate from the flow of control information.

10 Claims, 4 Drawing Sheets

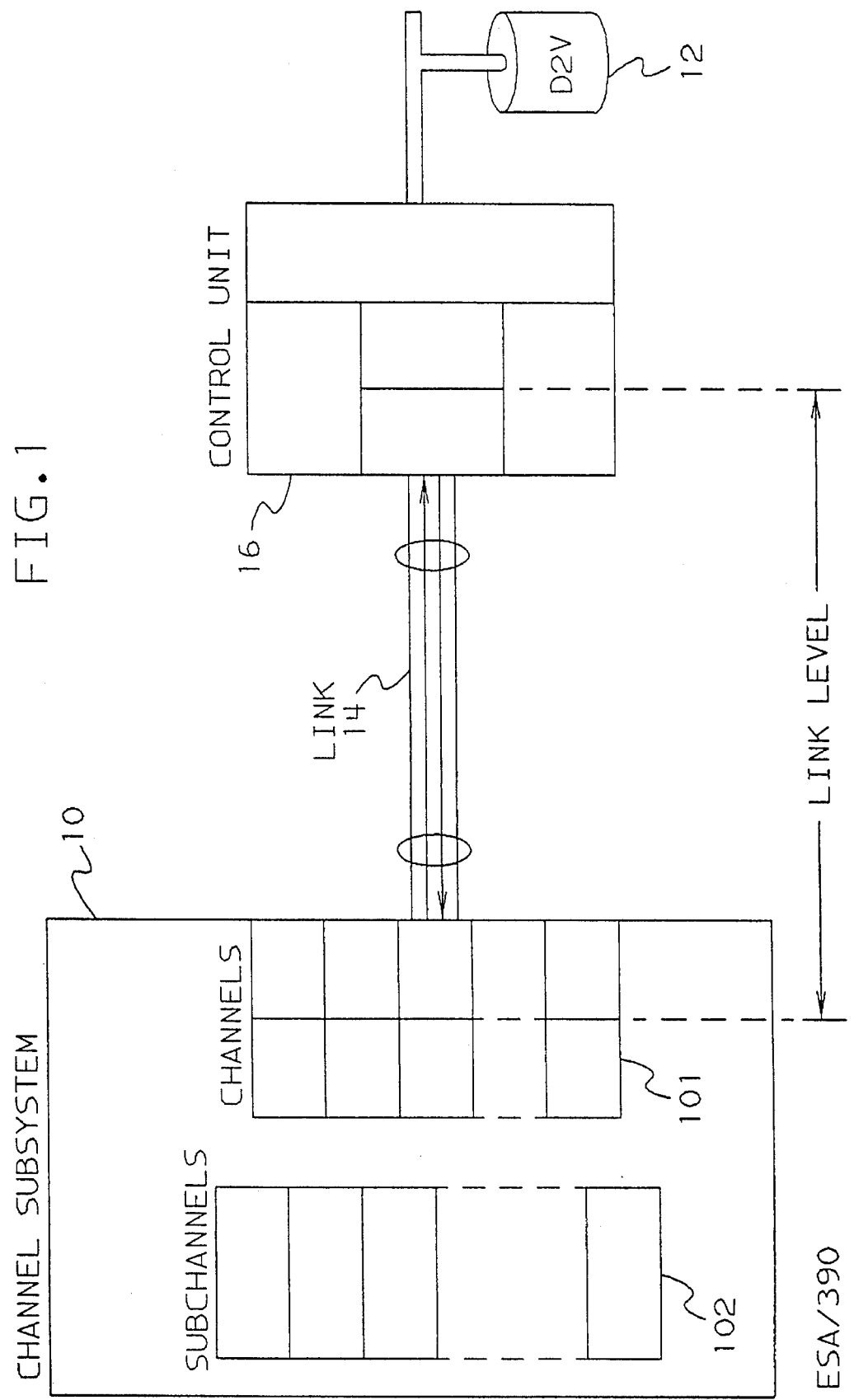

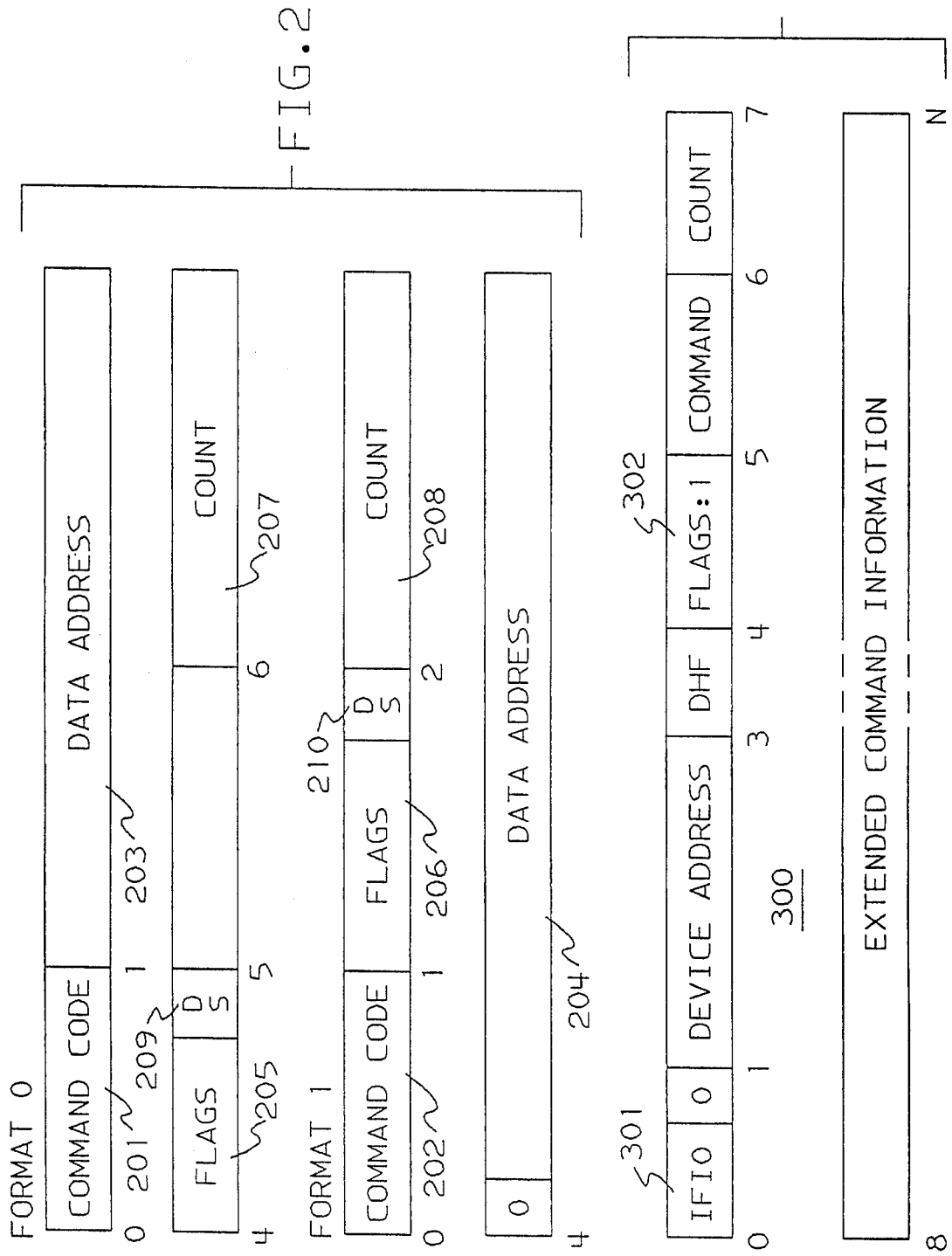

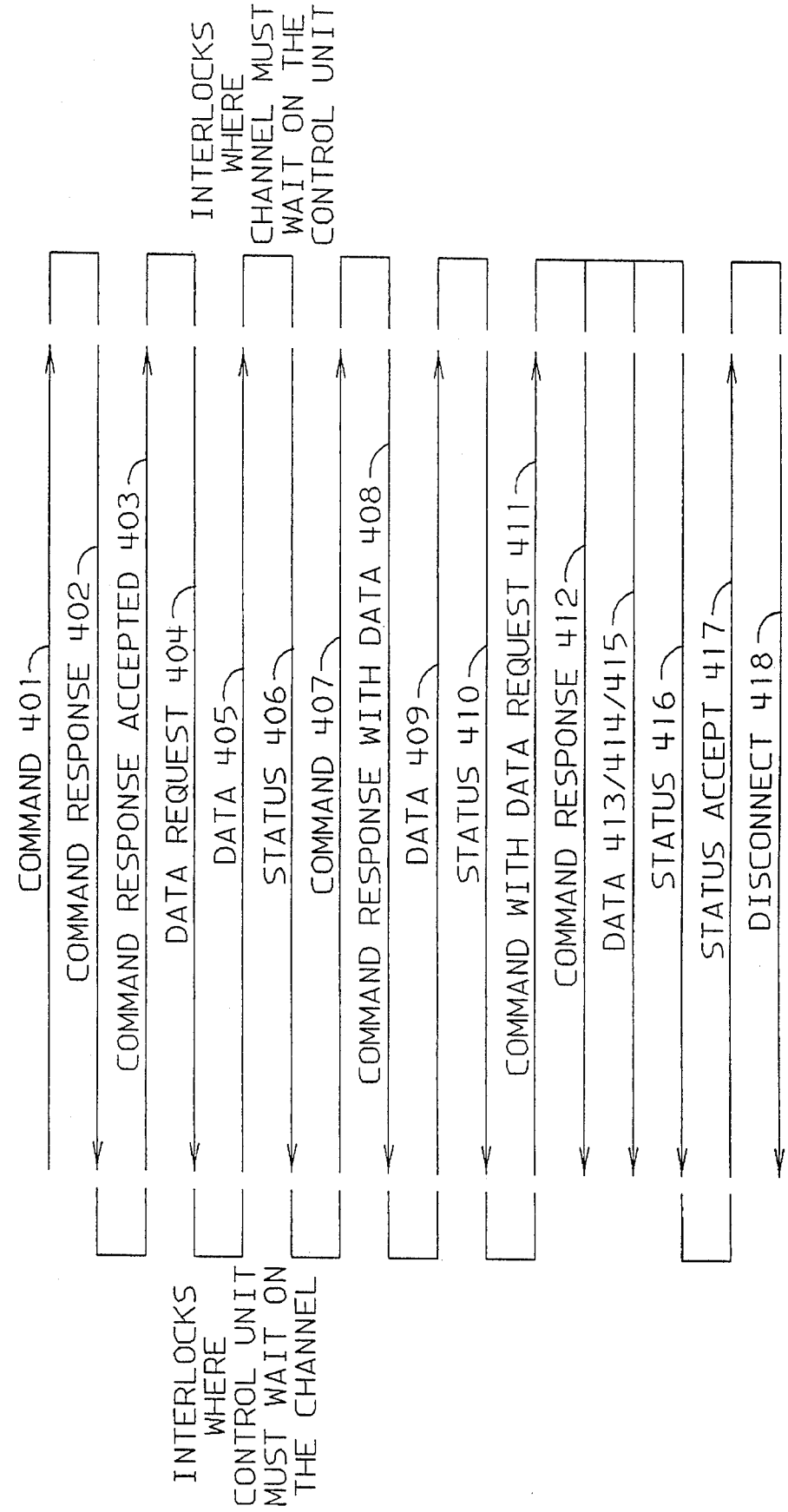

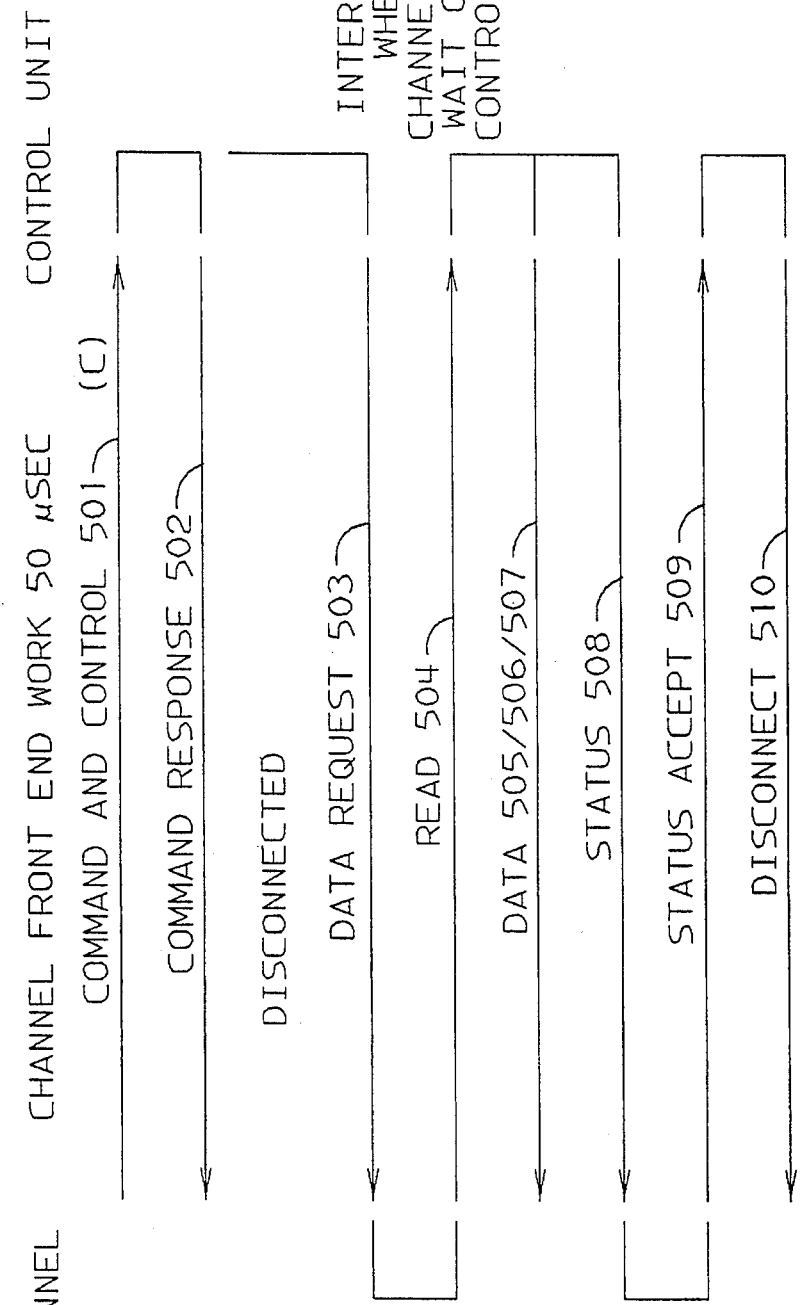

I/O ACCESS METHOD FOR USING FLAGS TO SELECTIVELY CONTROL DATA OPERATION BETWEEN CONTROL UNIT AND I/O CHANNEL TO ALLOW THEM PROCEED INDEPENDENTLY AND CONCURRENTLY

This is a continuation of Ser. No. 07/950,844 filed on Sep. 24, 1992 now abandoned.

BACKGROUND OF THE INVENTION

1. Field of the Invention

The present invention generally relates to input/output (I/O) processing in data processing systems and, more particularly, to systems and methods of transferring information between the channel subsystem and I/O devices.

2. Description of the Prior Art

As used herein, the terms "input" and "output" are used to describe the transfer of data between devices, referred to as input/output (I/O) devices, and main storage in a data processing system. I/O devices typically include Direct Access Storage Devices (DASDs), such as disk and tape files. An operation involving a transfer of data between an I/O device and main storage is referred to as an I/O operation. In IBM ESA/390 data processing systems, the facilities used to control I/O operations are collectively called the channel subsystem. The I/O devices and their control units along with the channel subsystem are collectively called the I/O subsystem.

The channel subsystem directs the flow of information between I/O devices and main storage. It uses one or more channel paths as the communication link in managing this flow of information. As part of I/O processing, the channel subsystem also executes a path management operation. Within the channel subsystem are subchannels, one subchannel being provided for and dedicated to each I/O device accessible to the channel subsystem. Each subchannel provides information concerning the associated I/O device, its attachment to the channel subsystem, I/O operations and other functions involving the associated device. I/O devices are attached through control units to the channel subsystem by means of a channel path. Control units may be attached to the channel subsystem by more than one channel path and an I/O device may be attached to more than one control unit.

The subchannel provides the logical appearance of a device to a program. The subchannel consists of internal storage that contains information in the form of a Channel Control Word (CCW) address, channel-path identifiers, device number, count, status indications, as well as other information. I/O operations can be initiated by instructions executed by the Central Processing Unit (CPU) such as the start subchannel instruction. This instruction is part of a CPU program. When a start subchannel is executed, parameters are passed to the target subchannel requesting the channel subsystem to perform a start function with the associated I/O device.

An I/O operation is accomplished by the decoding and execution of a CCW by the channel subsystem and the I/O device. One or more CCWs are arranged for sequential execution for a channel program and are executed as one or more I/O operations, respectively. Both instructions and CCWs are fetched from main storage, and their respective formats are common for all types of I/O devices. The modifier bits in the command code of a CCW may specify device dependent operations such as rewinding tape or positioning the access mechanism on a disk drive.

Further details on I/O operations, particularly as they pertain to the ESA/390 data processing systems, may be found in the *IBM Enterprise Systems Architecture/390 Principles of Operation*, Publication SA22-7201-00, and the *IBM Enterprise Systems Architecture/390 ESCON I/O Interface*, Publication SA22-7201, both published by IBM Corp. See also the article by C. A. Scalzi et al. entitled "Enterprise Systems Architecture/370: An architecture for multiple virtual space access and authorization" published in *IBM Systems Journal*, vol. 28, no. 1, 1989, for additional background of this environment.

Current channels and control units are synchronized together through most of an I/O operation, even with the non-synchronous capability of control units like that used with the IBM 3990 control unit. Typically, in an IBM System 390 family or processors, the I/O request to transfer data (read or write) will contain multiple channel control words (CCWs). The CCWs include commands such as "Define Extent" chained to a "Locate Record" followed by the command to either read or write. In the System 390 architecture, the channel and device are allowed to disconnect from each other, in the middle of an I/O operation, only between a Channel-end and a Device-end when a Chain Command has been indicated. With both the channel and device connected to each other for most of the operation, progress at either end is tied to progress on both ends.

A typical channel I/O request to a direct access storage device (DASD) attached via a channel can keep the channel busy for over a thousand microseconds when less than fifty microseconds are used to actually transfer data, even with a "cache hit" in a 3990 control unit. This very inefficient utilization of the channel requires large numbers of channels in the I/O subsystem to provide sufficient bandwidth. Large numbers of channels make the design of the channel subsystem complex and costly. Since a majority of the control units attached to channels in the computer complex are typically DASD control units, improvements in channel utilization are tied to improvements in DASD control unit utilization.

SUMMARY OF THE INVENTION

It is therefore an object of the present invention to provide a technique that allows the channel and device to be more independent and thus allows both to be optimized to their own design.

According to the invention, there is provided an access method that allows the separation of the command stream being sent to the control unit from the command stream interpreted by the channel. This access method allows the I/O subsystem to, first, reduce the number of interlocks required on the I/O interface. Second, the access method transfers as much of the I/O operation to the device as possible in a single block of data. Third, the access method allows the channel and device to "disconnect" from each other at the end of the transfer of this control information.

The access method according to the invention prepares the information to be transferred to the device in a single command. In a specific example, a first command of the channel I/O request transfers all of the information to the device as a single block of data. This is accomplished by means of a new flag in the CCW, using the spare bit in the flag field, called the DS flag (Dual command Stream operation). This flag allows the channel to operate as if it were a Chain Command (CC) from the view point of direction of data flow in the channel and a Chain Data (CD) from the view point of transferring control information across the interface. Thus, the channel I/O request can, under a single command to a device, control the direction (read or write) of the flow of data separate from the flow of control information.

There is minimal impact to existing architecture. The channel already has the ability to disconnect from a control unit. The only modification to the architecture is to the microcode of the controller to allow the channel and device to disconnect at the end of transfer of data when the DS flag is present. The packaging of the information to be transferred to the device specified in the first CCW is with a new CCW, referred to as "Define Read" or "Define Write". This packaging is similar to passing a control block with parameters. Alternatively, the information could simply have the same definition and content of putting all three commands in the same record and transferred to the device. This command is defined so that a write is detected by the channel and the information is transferred to the device. The command is sent to the device on an outbound (from the channel) frame with a connect request in the frame. The device accepts the command and requests the data on a single inbound frame. The channel then sends the data, in a single frame if possible. The device acknowledges the frame with a disconnect request at the end of the frame. At this point the channel and device are disconnected, allowing them both to make progress independently. There are twelve frames and six interlocks on a typical I/O request up to the frame acknowledging the Read or Write command. With this invention, there are only four frames and two interlocks, a three time improvement in both.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a block diagram of an I/O subsystem structure on which the invention may be implemented;

FIG. 2 is a block diagram showing two different CCW formats;

FIG. 3 is a block diagram showing the format of the extended command frame;

FIG. 4 is a timing diagram showing a typical channel I/O request for a single read; and FIG. 5 is a timing diagram showing an example of the reduction of channel busy time possible with the practice of the invention.

DETAILED DESCRIPTION OF A PREFERRED EMBODIMENT OF THE INVENTION

Referring now to the drawings, and more particularly to FIG. 1, there is shown the basic I/O subsystem structure for the IBM ESA/390 processor, which is the preferred environment of the subject invention. The channel subsystem 10 directs the flow of information between I/O devices 12, such as Direct Access Storage Devices (DASDs), and main storage (not shown). The channel subsystem 10 uses one or more channels 101 connected by communication links 14 to one or more control units 16 as the channel paths in managing the flow of information. As part of I/O processing, the channel subsystem 10 also executes a path management operation. Within the channel subsystem 10 are subchannels 102, one subchannel being provided for and dedicated to each I/O device 12 accessible to the channel subsystem 10. Each subchannel 102 provides information concerning the associated I/O device 12, its attachment to the channel subsystem, I/O operations and other functions involving the associated device.

In practice, multiple I/O devices 12 are attached through multiple control units 16 to the channel subsystem 10, although for the sake of simplicity, only one control unit and one I/O device are shown. The control units may be attached to the channel subsystem 10 by more than one channel path and an I/O device may be attached to more than one control unit.

The subchannel 102 provides the logical appearance of a device to a program run on the processor. The subchannel 102 consists of internal storage (not shown) that contains information in the form of a Channel Control Word (CCW) address, channel-path identifiers, device number, count, status indications, as well as other information. I/O operations can be initiated by instructions executed by the Central Processing Unit (CPU) as part of a CPU program. When a start subchannel is executed, parameters are passed to the target subchannel requesting the channel subsystem 10 to perform a start function with the associated I/O device.

An I/O operation is accomplished by the decoding and execution of a CCW by the channel subsystem 10 and the I/O device 12. One or more CCWs are arranged for sequential execution for a channel program and are executed as one or more I/O operations, respectively. Both instructions and CCWs are fetched from main storage (not shown), and their respective formats are common for all types of I/O devices. The modifier bits in the command code of a CCW may specify device dependent operations such as rewinding tape or positioning the access mechanism on a disk drive.

An example of a host processor is the IBM ES/9000 Processor. The IBM ES/9000 processor is a compatible growth system that uses any of the IBM ES Operating Systems such as the Multiple Virtual. Storage/ESA (MVS/ESA) or Virtual Machine/ESA (VM/ESA) operating systems. The operating system controls the flow of data to and from main storage and provides an application environment which is System/390 compatible. Information on the System/390 may be found in reference to *IBM Enterprise Systems Architecture/390 Principles of Operation*, supra. An example of a DASD control unit 16 is the IBM 3990 Model 3 Storage Control. The IBM 3990 Model 3 contains a high speed cache and two storage directors, each with a dual storage path for independent control of attached DASD device 12. A good example of a DASD device 12 is the IBM 3390 Model 3 DASD, which provides a fixed-medium head and disk assembly (HDA) that contains the heads, disks and access mechanisms (actuators) within a sealed enclosure. Each 3990 Model 3 unit contains multiple HDAs. A string of 3390 DASDs can attach to a 3990 Storage Control. Information on this 3990 Storage Control may be found in reference to IBM 3990 Storage Control Introduction, Publication GA32-0098-03, published by IBM Corp.

The IBM S/390 architecture implements channel control words (CCWs) that contain the information to direct I/O operations. Examples of the formats of CCWs are shown in FIG. 2. While the two formats illustrated differ, they have in common a command code field 201,202, a data address field 203,204, a flags field 205,206, and a count field 207, 208. The access method according to the invention prepares the information to be transferred to the device in a single command. In a specific example, a first command of the channel I/O request would transfer all of the information to the device contained in the Define Extent, Locate Record and the first Read or Write as a single block of data, as shown in FIG. 3. This is accomplished by means of a new flag in the CCW, using the spare bit in the flag field, called the DS (Dual command Stream operation) flag, shown in FIG. 2 as DS flags 209 or 210. This flag allows the channel to operate as if it were a Chain Command (CC) from the view point of direction of data flow in the channel and a Chain Data (CD) from the view point of transferring control information across the interface. Thus, the channel I/O request can, under a single command to a device, control the direction (read or write) of the flow of data separate from the flow of control information.

There is minimal impact to existing architecture since the channel subsystem 10 (shown in FIG. 1 but not illustrated in FIG. 3) already has the ability to disconnect from a control unit 16 (shown in FIG. 1 but not illustrated in FIG. 3). The extended Command Frame illustrated in FIG. 3 is defined as a Device Frame type in the link-control field (i.e., bit 7 set to a one) and as a Data Type Frame in the Device-frame type bits (i.e., bits 6 and 7 set to zeros) of the Information Field Identifier (IFI) 301. The modifications to the architecture include changes to the microcode of the control unit 16 (shown in FIG. 1 but not illustrated in FIG. 3) to allow the channel subsystem 10 (shown in FIG. 1 but not illustrated in FIG. 3) and device 12 (shown in FIG. 1 but not illustrated in FIG. 3) to disconnect at the end of transfer of data when the DS flag is present. The packaging of the information to be transferred to the device 12 specified in the first CCW is with a new CCW, referred to as "Define Read" or "Define Write". Alternatively, the information could simply have the same definition and content of putting all three commands in the same record and transferred to the device. This command is defined so that a write is detected by the channel subsystem 10 and the information is transferred to the device 12. The command is sent to the device 12 on an outbound (from the channel) frame with a connect request in the frame. The control unit 16 accepts the command and requests the data on a single inbound flame. The channel subsystem 10 then sends the data, in a single frame if possible. The control unit 16 acknowledges the frame with a disconnect request at the end of the frame. At this point the channel subsystem 10 and control unit 16 are disconnected, allowing them both to make progress independently. There are twelve frames and six interlocks on a typical I/O request up to the frame acknowledging the Read or Write command. With this invention, there are only four flames and two interlocks, a three time improvement in both.

FIG. 4 depicts a typical sequence between a channel and control unit under the current interface. The channel subsystem 10, after completion of some front end work, attempts to initiate an I/O operation by sending a command frame 401 to the control unit 16. The command frame contains the Information Field Identifier (IFI) which identifies device frame type, in this case a command frame. In addition, this frame contains the Device Address, Command Flags, Command, and Count. The control unit 16 upon receiving, decoding and accepting the command frame sends a Command Response frame 402. The I/O operation is considered to be in progress by the channel when it sends the response 403 indicating the command response was accepted. The control unit 16 may indicate it is ready to accept data from the command (write) by either setting the Data Request (DR) flag to a "one" in the command response frame or, as in the illustrated case, in a subsequent Data Request frame 404. The channel subsystem 10 then sends the data specified by the define extent command in a data frame 405. The flag field in the frame 401 has the CC flag in the command flag field set to a "one" indicating a Chain Command (CC). The control unit 16 indicates the end of the first CCW by sending a status frame 406. The channel subsystem 10 indicates the acceptance of status and sends the new command by sending a command frame 407 with the CH and CC flags set and the new command Locate Record (write). This time, the control unit 16 accepts the command and simultaneously indicates its readiness to accept data by setting the DR flag to a "one" in the command response frame 408. Since this is not the first command of the channel program, the channel subsystem 10 does not indicate acceptance of this response. The channel subsystem 10 can follow frame 408 with a data frame 409 containing the data from the Locate Record command 407. The control unit 16 again indicates acceptance of the data with a status frame 410. This initiates the transfer of the last command frame 411, a read, where the channel subsystem 10 has indicated its immediate readiness to accept data by setting the DR flag to a "one" in the command frame. The control unit 16 again indicates its acceptance of the command with a command response frame 412. The read, in this case, takes several data frames 413, 414, and 4 15 to complete. The control unit 16 then initiates the ending of the I/O operation by transferring a Status frame 416, and the channel subsystem responds by sending a Status Accepted frame 417. The control unit 16 acknowledges this with a Device Level Acknowledgement frame 418, with the disconnect End of Frame (EOF) delimiter freeing the path from the control unit 16 to the channel subsystem 10.

FIG. 5 depicts the same end result as shown in FIG. 4 demonstrating the preferred embodiment of the invention. The access method/device driver builds a different channel program. The first CCW contains a write command 501 with the address and count pointing to the command control block containing the equivalent information as the three CCWs in the previous example. The DS flag 209 or 210 in the CCWs shown in FIG. 2 is set, indicating to the channel subsystem 10 to send this information in an extended command frame 300 with a connect Start of Frame (SOF) delimiter and the DS flag 302 set in the Extended Command Frame shown in FIG. 3. For ease of initial implementation, the amount of control information that is sent is limited to the maximum frame size. The control unit 16 responds with a command response frame 502 with the disconnect EOF delimiter. The channel path to the control unit is freed at this point. The control unit 16 after decoding the command and making the data ready to be sent to the channel initiates a reconnection to a channel by sending a Data Request (DR) frame 503 with a connect SOF delimiter to the channel subsystem 10. The channel subsystem 10 responds with a Read frame 504 indicating it is ready to receive the data. The data frames 505,506 and 507 are sent transferring the same data indicated in FIG. 4 by frames 413 to 415. The ending sequence 508, 509 and 510 is identical to the ending sequence 416 to 418 in FIG. 4.

The preferred embodiment was chosen to minimize the impact to current architecture. Other embodiments could include expanding the amount of information contained in the initial frame 300 to multiple frames and modifying the ending sequence to reduce the number of frames even more.

The second CCW in this example is built by the program to indicate to the channel to expect to read data. The count and address fields in the CCW are the same as the count and address fields as the read CCW in FIG. 4. The DS flag in the first channel control word CCW1 indicates the next CCW is for the channel and the next CCW is not to be sent to the control unit. The DS flag is used to indicate the next CCW is for channel control and is not sent to the control unit. The Chain Command (CC) and Chain Dam (CD) flags follow current definitions. See Table 1. The rules for the use of the DS flag are as follows:

1. The first CCW of a Channel Program is always sent to the control unit.
2. A CCW with the Chain Command Flag set is always sent to a control unit.
3. When the command is to be sent to a control unit, the DS flag indicates the Extended Command Frame format is to be used. The command must indicate a write or control with bit 7 of the Command Field set to a one.
4. The DS flag will cause the channel to fetch the next CCW of the Channel Program at the completion of the current CCW. The next CCW may be pre-fetched.
5. The DS flag will cause the channel to use the command (read or write) count and data address indicated in the next CCW. The CCW is not to be sent to a control unit.
6. The CD flag must be zero when the DS flag is set to a one.
7. When the DS and CC flags are set to a one, the next CCW must not have the CC flag set to a one.
8. The DS flag alone does not cause a command frame to be sent to the control unit.

TABLE 1

| Flags | | | |
|---|---|---|---|
| DS | CC | CD | Action |
| 1 | 0 | 0 | Send extended command if the CCW is the first of a channel program. Next CCW is for channel control. |
| 1 | 1 | 0 | Send extended command frame to the control unit. Next CCW is for channel control. First CCW without DS flag is CCW for control unit. |
| 1 | 0 | 1 | Not valid. |
| 1 | 1 | 1 | Not valid. |
| 0 | X | X | As in current architecture. |

In the preferred embodiment of this invention, the device access method builds a control block that contains all the commands necessary for the device. This control block is pointed to by the data address in the first CCW, with the appropriate count field and the newly defined DS flag set. If insufficient code points remain in the command field for the particular control unit, the CC flag can be set at the same time. The presence of a new command or the combination of the DS and CC flag would then indicate the new operation. The remaining CCWs would only have the DS flag set. The command field is not sent to the control unit; it is used by the channel to indicate either a read or a write. The address and count field are used as normal, similar to a chain data. The presence of either the CC or CD flag is not allowed in follow-on CCWs, as none of the information in these CCWs is transferred to the control unit. The control block transferred to the control unit indicates a transfer of a large block of data, multiple reads, multiple writes or any combination or the above.

Implementation variations are possible, depending on the changes made to the access method and the control unit. One implementation can be to send the information necessary for each read, or write, of the channel I/O request in a separate frame. This reduces the buffering and complexities in the control unit. Other implementations can send all the information contained in the channel I/O request in a single frame, using CCWs with the DS flag set to control the direction of data.

Advantages of this type of operation over existing implementation are in several areas. The channel is free during most of the I/O operation compared to the current practice. This allows systems to increase the ratio of control units to I/O channels and maintain an equivalent level of performance. Control units can be given the entire channel I/O request and be permitted to optimize their operation free from dependency on the channel. Thus, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a data processing system having an interface with input/output (I/O) channels, said I/O channels communicating with storage devices which are connected to control units, an I/O access method which allows separation of a command stream being sent to a control unit from a command stream interpreted by an I/O channel, said method comprising the steps of:

generating a channel program having a plurality of Channel Control Words (CCWs) arranged for sequential execution, said CCWs including a Dual command Stream operation (DS) flag;

setting said DS flag in a data command sent to said I/O channel indicating to said I/O channel that an extended command frame including control information is to be sent, as a single command, to said control unit;

decoding said data command and detecting the DS flag by said I/O channel and sending said extended command frame as a single command to said control unit;

responding by said control unit to said extended command frame by sending a command response to said I/O channel and thereafter disconnecting by said control unit from said I/O channel;

decoding said extended command frame and accessing specified data from a storage device by said control unit while disconnected from said I/O channel;

sending a data request by said control unit to said I/O channel when data accessed from said storage device is ready to be sent to said I/O channel;

responding to said data request from said control unit by said I/O channel by sending a read frame to said control unit; and sending information as a single block of data in one or more successive frames to said I/O channel by said control unit, wherein said DS flag maintains synchronization between said control unit and I/O access and wherein all information required for data transfer is received by said control unit prior to said data transfer beginning, wherein after responding to said extended command frame by said control unit, said I/O channel and said control unit proceed independently.

2. The I/O access method recited in claim 1 further comprising the steps of:

initiating an ending of a data access by said control unit after sending said data to said I/O channel by sending a status frame to said I/O channel; and responding to said status frame from said control unit by said I/O channel by sending to said control unit a status accept frame and disconnecting from said control unit.

3. The I/O access method recited in claim 1 wherein interlocks, at which one of said control unit waits for said I/O channel and said I/O channel waits for said control unit, occur only at transfers of commands and data.

4. The I/O access method recited in claim 2 wherein interlocks, at which one of said control unit waits for said I/O channel and said I/O channel waits for said control unit, occur only at transfers of commands and data.

5. The I/O access method recited in claim 3 wherein said control unit executes a program sent by the extended command frame and said I/O channel executes a program indicated by CCWs with the DS flag set.

6. The I/O access method recited in claim 4 wherein said program executed by said control unit and said program executed by said I/O channel are compatible, interlocked and verified by data sequences on said interface between the control unit and said I/O channel.

7. The I/O access method recited in claim 1 further comprising the step of:

initiating an ending of a data access by said control unit after sending said data to said I/O channel by sending a status frame to said I/O channel.

8. The I/O access method recited in claim 7 further comprising the step of:

responding to said status frame from said control unit by said I/O channel by sending to said control unit a status accept frame and disconnecting from said control unit.

9. In a data processing system having input/output (I/O) channels, said I/O channels communicating with storage devices which are connected to control units, an I/O access method which allows separation of a command stream being send to a control unit from a command stream interpreted by an I/O channel, said method comprising the steps of:

generating a channel program having a plurality of Channel Control Words (CCWs) arranged for sequential executing, said CCWs including a Dual command Stream operation (DS) flag and a Chain Command (CC) flag;

sending a first CCW of said channel program to one of said control units via one of said I/O channels;

sending a subsequent CCW with said Chain Command (CC) flag set to said control unit via one of said I/O channels; and when a command is to be sent to said control unit, setting the DS flag to indicate an extended command frame format is to be used in which an extended command frame including control information is sent to said control unit as a single command, the setting of the DS flag causing said channel to fetch a next CCW of the channel program at a completion of sending a current CCW with the DS flag set, said next CCW is not to be sent to said control unit, wherein said DS flag maintains synchronization between said control unit and I/O access and wherein all information required for data transfer in said I/O access is received by said control unit prior to beginning of said data transfer, wherein said control unit executes a program sent by the extended command frame and said I/O channel executes another program indicated by said current CCW with the DS flag set and said next CCW respectively, wherein said I/O channel and said control unit proceed independently.

10. The I/O access method recited in claim 9 wherein interlocks, at which one of said control unit waits for said I/O channel and said I/O channel waits for said control unit, occur only at transfers of commands and data.

\* \* \* \* \*